US010162357B2

(12) United States Patent
Michalakis et al.

(10) Patent No.: US 10,162,357 B2
(45) Date of Patent: Dec. 25, 2018

(54) DISTRIBUTED COMPUTING AMONG VEHICLES

(71) Applicant: TOYOTA RESEARCH INSTITUTE, INC., Los Altos, CA (US)

(72) Inventors: Nikolaos Michalakis, Saratoga, CA (US); Julian M. Mason, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 15/459,334

(22) Filed: Mar. 15, 2017

(65) Prior Publication Data

US 2018/0267547 A1 Sep. 20, 2018

(51) Int. Cl.

*G05D 1/00* (2006.01)
*G05D 1/02* (2006.01)
*G08G 1/0967* (2006.01)

(52) U.S. Cl.

CPC ......... *G05D 1/0214* (2013.01); *G05D 1/0276* (2013.01); *G08G 1/096791* (2013.01)

(58) Field of Classification Search

None

See application file for complete search history.

(56) References Cited

U.S. PATENT DOCUMENTS 7,486,202 B2 * 2/2009 Konishi ................. G08G 1/163 340/901
7,760,110 B1 * 7/2010 Janke ............... G08G 1/096716 340/902
8,466,807 B2 * 6/2013 Mudalige ............... G08G 1/163 340/435
8,554,463 B2 * 10/2013 Rosario .................. G01C 21/26 701/400
8,660,734 B2 2/2014 Zhu et al.
8,885,039 B2 * 11/2014 Jang ....................... G01C 21/36 340/436

(Continued)

OTHER PUBLICATIONS

Nikolaos Michalakis, et al., "Ensuring Content Integrity for Untrusted Peer-to-Peer Content Distribution Networks", USENIX Association, 4th USENIX Symposium on Networked Systems Design & Implementation, NSDI, 2007, pp. 145-158.

(Continued)

*Primary Examiner* — Jonathan M Dager

(74) *Attorney, Agent, or Firm* — Oblon, McClelland, Maier & Neustadt, L.L.P.

(57) ABSTRACT

Aspects of the disclosure provide a method for collaboratively determining an object. The method includes receiving sensor data indicating an object at a first vehicle of a group of vehicles communicating with each other, transmitting a first request including the sensor data and specifying a first task for determining the object from the first vehicle to a second vehicle of the group of vehicles, and transmitting a second request specifying a second task for determining the object from the first vehicle to a third vehicle of the group of vehicle. The first task is performed by the second vehicle to produce first intermediate data, and the second task is performed by the third vehicle based on the intermediate data produced by the second vehicle.

14 Claims, 4 Drawing Sheets

(56) References Cited

U.S. PATENT DOCUMENTS

| | | | | |
|---|---|---|---|---|
| 8,965,677 | B2 * | 2/2015 | Breed | B60W 30/04 701/301 |
| 9,036,509 | B1 * | 5/2015 | Addepalli | H04W 4/046 370/259 |
| 9,053,394 | B2 | 6/2015 | Bruemmer et al. | |
| 9,092,984 | B2 | 7/2015 | Bahl et al. | |
| 9,215,124 | B2 * | 12/2015 | Yousefi | H04N 7/183 |
| 9,451,020 | B2 | 9/2016 | Liu et al. | |
| 9,494,944 | B2 | 11/2016 | Alam et al. | |
| 9,620,143 | B2 * | 4/2017 | Tanaka | G10L 21/06 |
| 2002/0026266 | A1 * | 2/2002 | Montague | B60R 25/102 701/1 |
| 2004/0116106 | A1 * | 6/2004 | Shishido | H04L 29/06 455/414.2 |
| 2004/0128062 | A1 * | 7/2004 | Ogino | G01C 21/26 701/400 |
| 2008/0122607 | A1 * | 5/2008 | Bradley | B60Q 1/0017 340/468 |
| 2009/0016262 | A1 * | 1/2009 | Kulkarni | H04W 24/08 370/328 |
| 2010/0080168 | A1 * | 4/2010 | Fukuyama | H04L 45/121 370/328 |
| 2010/0207787 | A1 * | 8/2010 | Catten | G06F 17/30241 340/905 |
| 2010/0240299 | A1 * | 9/2010 | Karino | G01C 21/26 455/3.06 |
| 2011/0227757 | A1 * | 9/2011 | Chen | G08G 1/0104 340/902 |
| 2012/0087292 | A1 * | 4/2012 | Grimm | H04W 72/02 370/312 |
| 2013/0082874 | A1 * | 4/2013 | Zhang | G01S 5/0072 342/357.31 |
| 2013/0325306 | A1 | 12/2013 | Caveney et al. | |
| 2015/0145695 | A1 * | 5/2015 | Hyde | G06Q 40/08 340/905 |
| 2015/0210302 | A1 | 7/2015 | Kraeling et al. | |
| 2015/0287311 | A1 * | 10/2015 | Smith | G08B 19/00 340/521 |
| 2016/0124976 | A1 * | 5/2016 | Bai | G06F 17/3087 707/748 |
| 2016/0231122 | A1 * | 8/2016 | Beaurepaire | G01C 21/34 |
| 2016/0232791 | A1 * | 8/2016 | Tosa | B60W 30/14 |
| 2016/0328976 | A1 * | 11/2016 | Jo | F02D 41/403 |
| 2016/0358477 | A1 * | 12/2016 | Ansari | G08G 1/167 |
| 2017/0110011 | A1 * | 4/2017 | Tonguz | G08G 1/161 |
| 2017/0123422 | A1 * | 5/2017 | Kentley | B60H 1/00735 |
| 2017/0132922 | A1 * | 5/2017 | Gupta | G08G 1/0962 |
| 2017/0132934 | A1 * | 5/2017 | Kentley | G08G 1/202 |
| 2017/0176196 | A1 * | 6/2017 | Powers | B60W 40/06 |
| 2017/0178514 | A1 * | 6/2017 | Dry | H04W 4/46 |
| 2017/0264688 | A1 * | 9/2017 | Sell | H04L 67/12 |
| 2017/0336213 | A1 * | 11/2017 | Fowe | G01C 21/26 |
| 2017/0366935 | A1 * | 12/2017 | Ahmadzadeh | H04W 4/70 |
| 2018/0066957 | A1 * | 3/2018 | Stroila | G01C 21/3694 |
| 2018/0090003 | A1 * | 3/2018 | Masuda | G08G 1/096833 |

OTHER PUBLICATIONS

Robert Grimm, et al., "System Support for Pervasive Applications", ACM Transactions on Computer Systems, vol. 22, No. 4, Nov. 2004, pp. 421-486.

"Trusted Computing", Wikipedia, https://en.wikipedia.org/wiki/Trusted_Computing, Oct. 21, 2016, 14 pages.

* cited by examiner

DISTRIBUTED COMPUTING AMONG VEHICLES

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An autonomous vehicle is capable of sensing its environment and navigating without human input. For example, an autonomous vehicle can detect surroundings using a variety of techniques such as radar, lidar, GPS, odometry, and computer vision. A control system in the autonomous vehicle can interpret sensory information to identify obstacles and relevant signage as well as appropriate navigation paths. In addition, a group of autonomous vehicles can communicate with each other through an ad hoc network or a cellular mobile network. The U.S. Pat. No. 8,965,677 B2 patent disclosed a system for conveying data between a first vehicle and a second vehicle through a same or multiple wide area networks.

SUMMARY

Aspects of the disclosure provide a method for collaboratively determining an object. The method includes receiving sensor data indicating an object at a first vehicle of a group of vehicles communicating with each other, transmitting a first request including the sensor data and specifying a first task for determining the object from the first vehicle to a second vehicle of the group of vehicles, and transmitting a second request specifying a second task for determining the object from the first vehicle to a third vehicle of the group of vehicle. The first task is performed by the second vehicle to produce first intermediate data, and the second task is performed by the third vehicle based on the intermediate data produced by the second vehicle.

In one example, the method further includes receiving a conclusion of determining the object from the third vehicle performing the second task to reach the conclusion of determining the object. In another example, the method further includes creating vehicle profiles at the first vehicle corresponding to other members of the group of vehicles.

Embodiments of the method can further include selecting vehicles for respective tasks for determining the object. In one example, a vehicle having the most computation resources in a list of vehicles capable of performing a task is selected to perform the task. In another example, a vehicle whose communication channel to the first vehicle has the least delay in a list of vehicles capable of performing a task is selected to perform the task. In a further example, a vehicle of the same make as the first vehicle in a list of vehicles capable of performing a task is performed to perform the task.

Aspects of the disclosure provide an autonomous driving system. The autonomous driving system includes circuitry configured to receive sensor data indicating an object at a first vehicle of a group of vehicles communicating with each other, transmit a first request including the sensor data and specifying a first task for determining the object from the first vehicle to a second vehicle of the group of vehicles, and transmit a second request specifying a second task for determining the object from the first vehicle to a third vehicle of the group of vehicle. The first task is performed by the second vehicle to produce first intermediate data, and the second task is performed by the third vehicle based on the intermediate data produced by the second vehicle.

Aspects of the disclosure provide a method for collaboratively sensing road conditions. The method can include receiving a request for road condition information from a first vehicle at a second vehicle, and transmitting road condition information from the second vehicle to the first vehicle as a response to the request.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide techniques for leveraging computing power or capabilities of a group of vehicles to collaboratively determine an object or complete a sensing operation. In one example, a vehicle may capture an object and generate sensor data indicating the object, and request surrounding vehicles to determine the object based on the sensor data. The object may be a pedestrian, an animal, a non-functional car, a construction site, an obstacle, a signage, and the like. The object may be more than one element. For example, a construction site on a road may include a sign and a construction region. The determination process may include a number of tasks performed by multiple selected surrounding vehicles. In another example, a vehicle may request for road condition information of a specific road segment remote from the current location of the vehicle. As a response to the request, a vehicle travelling in the road segment may be activated to collect the road condition information with respective sensors and return the information to the requesting vehicle.

Figure 1:
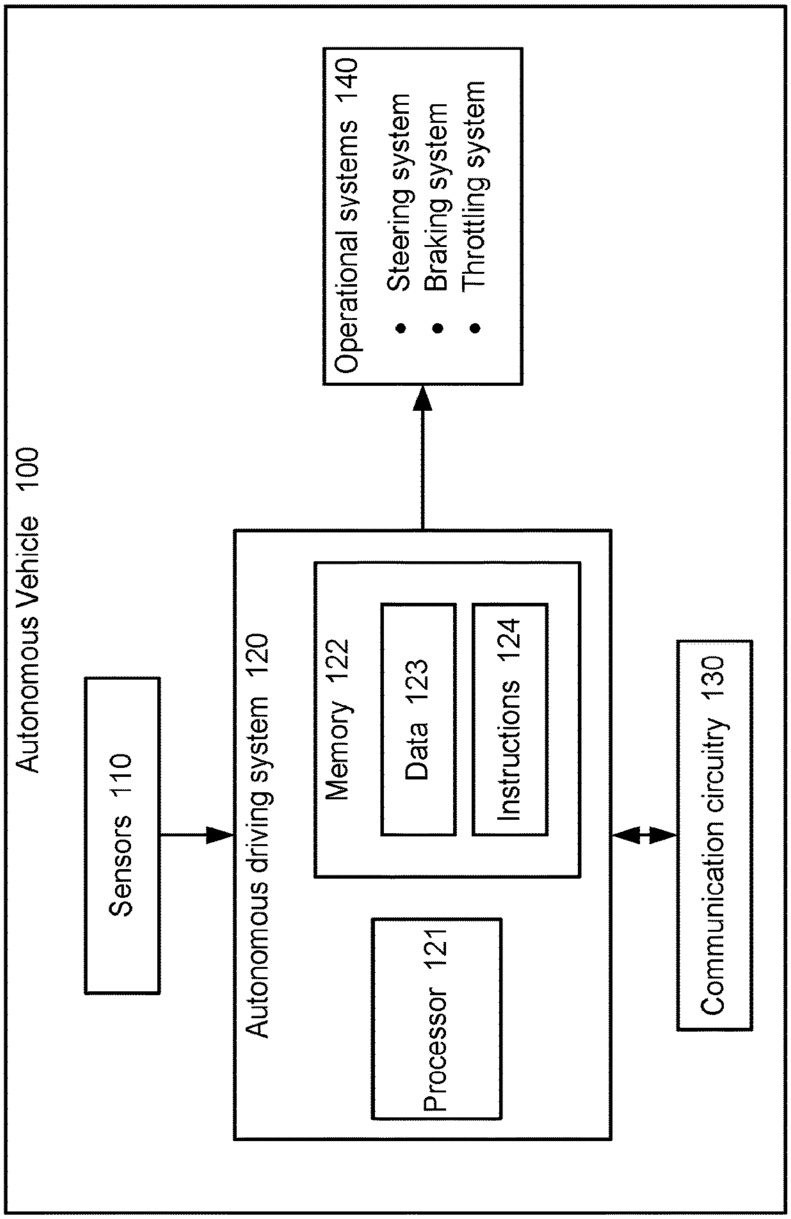
FIG. 1 shows an autonomous vehicle according to an embodiment of the disclosure.

FIG. 1 shows an autonomous vehicle 100 according to an embodiment of the disclosure. In some examples, the autonomous vehicle 100 is capable of performing various driving functions automatically without a human intervention. The driving functions may include steering control, braking control, throttling control, and the like. In other examples, the autonomous vehicle 100 performs tasks using resources owned by the autonomous vehicle 100 as responses to requests from other vehicles, thus facilitating collaborative driving operations of a group of vehicles. The autonomous vehicle 100 can be any type of vehicle, such as cars, trucks, motorcycles, buses, boats, airplanes, trams, golf carts, trains, trolleys, and the like. In one example, the autonomous vehicle 100 includes sensors 110, an autonomous driving system 120, communication circuitry 130, and operational systems 140. These elements are coupled together as shown in FIG. 1.

The sensors 110 are configured to generate sensor data indicating road conditions. Road conditions refers to state of a road having impact on driving a vehicle, such as type of the road, traffic conditions, weather conditions, obstacles detected on the road, and the like. For example, the sensors 110 can include cameras, lidars, radars, microphones, and the like to monitor the environment of the autonomous vehicle 100. The cameras can produce data of images or videos capturing an object in the environment of the vehicle or reflecting traffic status of a road. The cameras can include a rotate camera, a stereo optic camera, a single multidirectional camera, and the like. The lidars can be configured to sense a nearby or remote object. For example, the lidars can produce data indicating distance to an object by illuminating the object with a beam of laser light and create images of the object based on the data. The lidars can use ultraviolet, visible, or near infrared light to image objects. The lidars can target a wide range of materials, including non-metallic objects, rocks, rain, and the like. The radars can sense an object using radio signals. For example, the radars can generate data indicating a distance, speed, and heading of a moving object. The microphones can sense sounds from objects and produce data of sounds. For example, the microphones can sense a sound of a siren from an emergency vehicle, such as a police car, an ambulance vehicle, and the like, and generate respective data.

The sensors 110 may include positioning sensors configured to provide data indication a location of the autonomous vehicle 100. Accordingly, travelling speed of the vehicle 100 can be calculated based on the location data. In an example, the positioning sensors include a satellite positioning signal receiver, such as a Global Positioning System (GPS) receiver. The sensors 110 may include other sensors for various purposes.

The autonomous driving system 120 can include a processor 121 and a memory 122. In one example, the autonomous driving system 120 is configured to automatically perform various driving functions according to road conditions. For example, a pedestrian may be captured crossing a road ahead of the autonomous vehicle 100 travelling on the road. The sensors 110 can capture the appearance of the pedestrian and generate sensor data indicating the appearance of an object. The autonomous driving system 120 can receive the sensor data and draw a conclusion that the detected object is a pedestrian. As a response to the conclusion, the autonomous driving system 120 can subsequently issue a driving operation command to the operational systems 140 to slow down the autonomous vehicle while approaching the pedestrian.

In another example, the autonomous driving system 120 is configured to perform a task requested by another vehicle using the sensors or computing resources owned by the autonomous driving system 120. For example, the autonomous driving system 120 may receive sensor data generated from a surrounding vehicle, and process the sensor data to draw a conclusion of determining an object based on the sensor data. For another example, the autonomous driving system 120 may receive a request for road conditions from a remote vehicle and provide local road condition information to the remote vehicle. For example, the road conditions can be determined based on sensor data from a camera or recent travelling speeds of the vehicle 100.

In one example, the processor 121 is configured to process sensor data to determine an object captured by the sensors 110. For example, the cameras may capture an appearance of a pedestrian, and generate image data indicating the pedestrian. The processor 121 receives the image data from the cameras. Alternatively, the sensor data can be first stored in the memory 122, and later read from the memory 122 by the processor 121. The processor 121 can subsequently process the sensor data to determine what object has been sensed. In one example, the processor 121 includes image processing circuitry that can process the image data and extract features of an object. The processor 121 may further include image recognition circuitry, such as a neural network trained for recognizing different objects, to calculate a result of the sensed object. The processor 121 can therefore determine the object to be a pedestrian as an initial conclusion of the detection process. In another example, the processor 121 can execute instructions of an image processing and recognition program to process the sensor data instead of using special signal processing circuitry. The instructions of respective programs may be stored in the memory 122. Alternatively, the processor 121 can trigger circuitry (not shown) outside the processor 121 to process the sensor data to determine what object has been sensed.

The above description uses image data processing as an example to illustrate the process for determining an object. However, other types of sensor data, such as data from the lidars, radars, microphones, and the like can also be used to determine a sensed object. Those sensor data can be used independently or in combination with other types of sensor data for determining an object. Accordingly, the processor 121 can include circuitry or execute programs suitable for processing different types of sensor data.

In one example, the processor 121 is configured to perform functions of collaboratively determining an object by a group of vehicles. For example, the sensors 110 may capture an appearance of a pedestrian on a road; however, the vehicle 100 may not have enough computational resources to process the sensor data. For example, the capability of the processor 121 is limited or computing resources are assigned for other tasks. The processor 121 can be configured to request for assistance from surrounding vehicles. For example, a number of tasks of processing the sensor data can be performed by surrounding vehicles as responses to the requests, and a final conclusion of the determination process can be returned to the vehicle 100. Conversely, the processor 121 may receive a request from a surrounding vehicle and accordingly perform a task to assist the surrounding vehicle to determine an object.

In one example, the processor 121 is configured to determine a road condition based on sensor data generated from the sensors. For example, the processor 121 may receive image data from one or more cameras, and execute an algorithm to determine traffic conditions of the road (e.g., heavy traffic, light traffic, etc.). Additionally, speed data of the vehicle 100 can be incorporated into the determination process to determine a traffic condition.

In one example, the processor 121 is configured to perform functions of collaboratively determine a road condition. Specifically, the processor 121 can transmit a request for road conditions to remote vehicles to acquire road condition information of a remote road segment. Alternatively, the processor 121 may receive a request from a remote vehicle and return local road condition information to the remote vehicle. The processor 121 may be further configured to forward the request to surrounding vehicles to obtain more road condition information.

The processor 121 can be implemented with any suitable software and hardware in various embodiments. In one example, the processor 121 includes one or more microprocessors which execute instructions stored in the memory 122 to perform functions described above. In one example, the processor 121 includes integrated circuits (IC), such as application specific integrated circuits (ASIC), field programmable gate arrays (FPGA), and the like.

In one example, the memory 122 is configured to store various data 123. The various data 123 may include sensor data generated from the sensors 110 at the autonomous vehicle 100 or sensor data received from surrounding vehicles. The various data 123 may include intermediate data generated during a determination process performed by a number of vehicles. The various data 123 may include road condition data generated based on local sensor data or received from a remote vehicle.

The memory 122 may be further configured to store instructions 124 of various programs. For example, the various programs may include programs implementing algorithms for processing the various sensor data to determine a sensed object or a road condition. The various programs may also include programs implementing the collaborative determination technique for determining an object or the collaborative sensing technique for obtaining road condition information. Further, the various programs may include other programs implementing other autonomous driving functions of the autonomous driving system 120. The instructions 124, when executed by the processor 121 or other processors in the autonomous driving system 120, causes the processor 121 or other processors to carry out various functions of the autonomous driving system 120. The memory 122 may be any type of memories capable of storing instructions and data, such as hard drive, ROM, RAM, flash memory, DVD, and the like.

The communication circuitry 130 is configured to provide a wireless communication channel between the autonomous vehicle 100 and other vehicles. In one example, the communication circuitry 130 can be configured to wirelessly communicate with communication circuitry in other vehicles via a wireless network, such as an LTE network, a WiMAX network, a CDMA network, a GSM network, and the like. Additionally or alternatively, the communication circuitry 130 can be configured to communicate with communication circuitry in other vehicles directly using suitable technologies, such as Wi-Fi, Bluetooth, ZigBee, dedicated short range communications (DSRC), and the like. In one example, a wireless channel between the autonomous vehicle 100 and another surrounding vehicle can be established via one or more surrounding vehicles which relay messages through the wireless channel.

The operational systems 140 include a steering system, a braking system, a throttling system, and the like in one example. Each system in the operational systems can include relays, motors, solenoids, pumps, and the like, and performs driving functions in response to control signals received from the autonomous driving system 120. Thus, autonomous driving functions can be realized.

Figure 2:
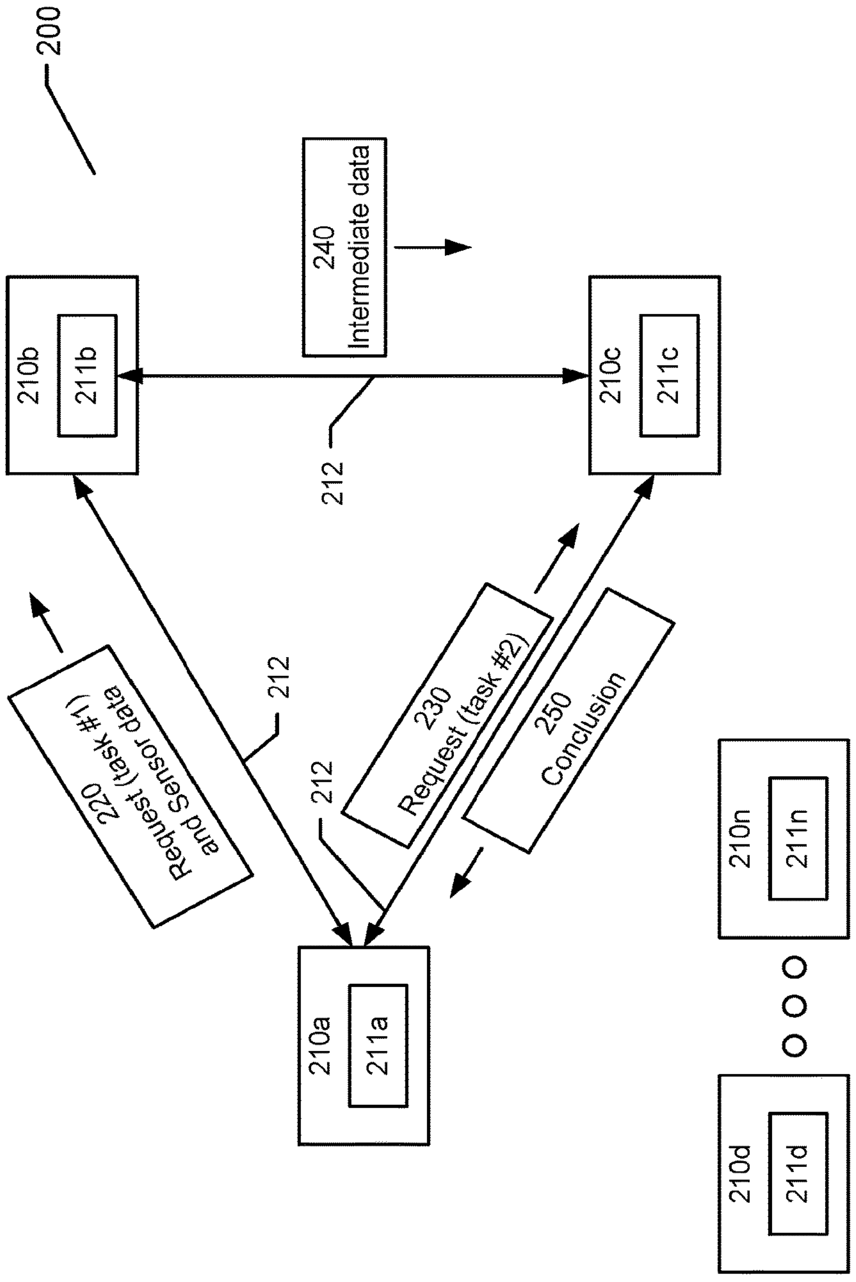
FIG. 2 shows a group of vehicles implementing a collaborative determination technique according to an embodiment of the disclosure.

FIG. 2 shows a group of vehicles 200 implementing the collaborative determination technique according to an embodiment of the disclosure. The group of vehicles 200 includes multiple vehicles 210*a*-210*n*. The group of vehicles 200 can communicate with each other. For example, the group of vehicles 200 can communicate through a cellular network. Alternatively, the group of vehicles 200 can form a wireless ad hoc network and communicate with each other through the ad hoc network. Wireless channels can thus be established between members of the group of vehicles 200. Wireless channels 212 between vehicles 210*a*-210*c* are shown in FIG. 2, while other wireless channels are not shown.

Structures and functions of each of the group of vehicles 200 can be similar to that of the vehicle 100 in FIG. 1 example. For example, each of the group of vehicles 200 may include sensors, an autonomous driving system, communication circuitry, and operational systems that are similar to the sensors 110, the autonomous driving system 120, the communication circuitry 130, and the operational systems 140 in FIG. 1 example, respectively. However, structures and functions of each of the group of vehicles 200 can be different from vehicle to vehicle. For example, members of the group of vehicles 200 may have different computation resources (for example, different number of processors with varied computational power) and may run different algorithms for detecting an object. Members of the group of vehicles 200 may be products of different auto makers, and may or may not have the capability to operate autonomously. Members of the group of vehicles 200 may be equipped with the same type of sensors but with different capabilities.

Assume the group of vehicles 200 forms a caravan travelling along a road, and the vehicle 210*a* captures appearance of an object on the road through its sensors. The vehicle 210*a* can then trigger the group of vehicles 200 to collaboratively perform a determination process to determine what object has been captured. In one example, the vehicle 210*a* does not have enough computation resources needed for the determination. In another example, the vehicle 210*a* is capable of processing the sensor data to reach a conclusion, however, respective computation resources of the vehicle 210*a* are not available, for example, have been assigned for other computation tasks at the moment. In a further example, the vehicle 210 does not trust the conclusion of the determination obtained by itself and needs to verify the conclusion with assistance from surrounding vehicles.

During the determination process, sensor data processing can be divided into separate tasks that are assigned to different members of the group of vehicles 200. The tasks can be performed in parallel or sequentially by selected vehicles. In one example, cameras are used for capturing the object and image data is generated accordingly. The sensor data processing for determining the object can be divided into two tasks, for example. A first task can be processing the image data to extract features from the images. A second task can be recognizing the object based on the extracted features. The two tasks require different algorithms to generate respective results.

During the determination process, the processor 211*a* can first select two vehicles from the group of vehicles 200 for the two tasks, respectively. To do so, the processor 211*a* may first check vehicle profiles stored in a memory of the vehicle 210*a* to identify members of the group of vehicles 200 that are capable of performing the first or the second tasks. For example, two lists of candidate vehicles corresponding to the two tasks may be generated previously. Suitable vehicles can be selected from the two lists, respectively, for each task. For candidate vehicles capable of performing both tasks, the processor 211*a* may determine to assign the two tasks to a same vehicle if respective computation resources are available, or to different vehicles to balance workload among the group vehicles 200.

The selection may be based on one or more factors. In one example, the processor 211*a* may choose from a list a candidate vehicle whose wireless communication channel to the vehicle 210*a* has the least transmission delay or is lower than a threshold. The transmission delay can be measured and obtained while the group of vehicles 200 establishing and maintaining the communication channels between each other by communication circuitry (such as the communication circuitry 130 in FIG. 1) in each vehicle.

In another example, the processor 211*a* may choose from a list a candidate vehicle having the most computation resources. For example, some vehicles in the group of vehicles 200 may have more powerful processors. During an object determination process, those more powerful processors are able to run more sophisticated sensor data processing algorithms to achieve more accurate results. Alternatively, some vehicles in the group of vehicles 200 may have higher network bandwidths and can access a server to obtain more computation resources for determining the object. In a further example, the processor 211*a* may select from a list a candidate vehicle of an auto maker the same as the vehicle 210*a* which the vehicle 210*a* trusts more than other vehicles.

Accordingly, the processors 211*a*-211*n* of the group of vehicles 200 may be configured to exchange information required for selection of vehicles in advance of the collective determination process. The information may include computation capability, computation resources, makers of vehicles, and the like. Profiles corresponding to each vehicle including the respective information can be stored in a memory in each of the group of vehicles 200.

Assuming the vehicles 210*b* and 210*c* are selected for performing the first and second tasks, respectively, the processor 211*a* can then transmit requests for performing the tasks to the selected vehicles 210*b* and 210*c*. For example, the processor 211*a* transmits a first request 220 to the vehicle 210*b*. The first request 220 includes the image data and indicates the first task assigned to the vehicle 210*b*. The processor 211*a* further transmits a second request 230 to the vehicle 21*c*. The second request 230 indicates the second task assigned to the vehicle 210*c*.

The processor 211*b* performs the first task as a response to the first request. For example, the processor 211*b* processes the received sensor data to produce intermediate data. In the current example, the image data is the received sensor data, and extracted features of the object is the intermediate data. The vehicle 210*b* then transmits the intermediate data (the extracted features of the object) to the vehicle 210*c*.

The processor 211*c* of the vehicle 210*c* performs the second task as a response to the second request. For example, upon receiving the intermediate data from the vehicle 210*b*, the processor 211*c* processes the intermediate data to reach a conclusion of determining the object. For example, the processor 211*c* may execute a neural learning network algorithm to recognize the object with the intermediate data as input. The processor 211*c* then transmits the conclusion 250 to the vehicle 210*a*. At the vehicle 210*a*, the conclusion 250 may be taken as the final conclusion of the determination. Alternatively, the processor 211*a* may use the received conclusion 250 to verify a conclusion calculated by itself. Based on the final conclusion, the processor 211*a* may take actions accordingly. For example, a driving operation command may be issued to the operating systems 140 to reduce speed of the vehicle 100.

In alternative examples, tasks for determining an object may be divided into more than two tasks. Accordingly, more than two surrounding vehicles can be selected for the collaborative determination process. In addition, the tasks can be performed either sequentially or in parallel. For example, one of those selected vehicles can receive intermediate data from two other selected vehicles, and completes a task based on the two parts of the intermediate data.

Figure 3:
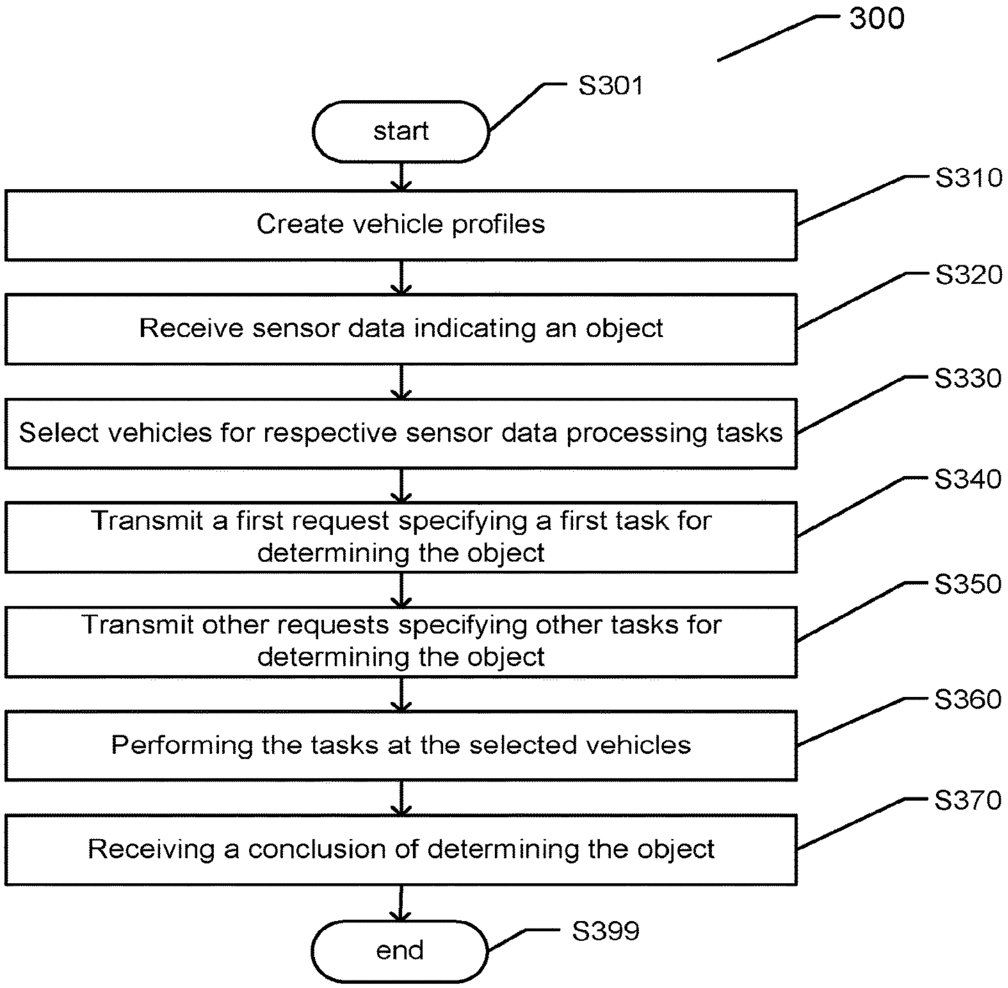
FIG. 3 shows a flowchart of a collaborative determination process according to an embodiment of the disclosure.

FIG. 3 shows a flowchart of a collaborative determination process 300 according to an embodiment of the disclosure. The process 300 can be performed by the group of vehicles 200 in FIG. 2 example. The process 300 starts at S301, and proceeds to S310.

At S310, vehicle profiles are created based on information exchanged between members of a group of vehicles at a first vehicle. The vehicle profiles correspond to each member of the group of vehicles, and may each include information describing communication delay to the first vehicle, computation capabilities for different tasks, computation resources, makes, and the like, of the respective vehicle.

At S320, sensor data indicating an object is generated and received at a first processor of a first vehicle of the group of vehicles.

At S330, vehicles for respective sensor data processing tasks are selected based on the vehicle profiles.

At S340, a first request specifying a first task for determining the object is transmitted to a first selected vehicle. The first request may include the sensor data indicating the object. In other examples, it is possible that, during the step of S340, more than one task are assigned to respective selected vehicles that process the sensor data in parallel.

At S350, one or more other requests specifying other tasks for determining the object are transmitted to respective selected vehicles.

At S360, the tasks assigned to each selected vehicles are performed sequentially or in parallel. Intermediate data can be generated and passed between selected vehicles.

At S370, a conclusion of determining the object can be received at the first vehicle from one of the selected vehicles which calculate the conclusion based on intermediate data received from one or more other selected vehicles. The process proceeds to S399, and terminates at S399.

Figure 4:
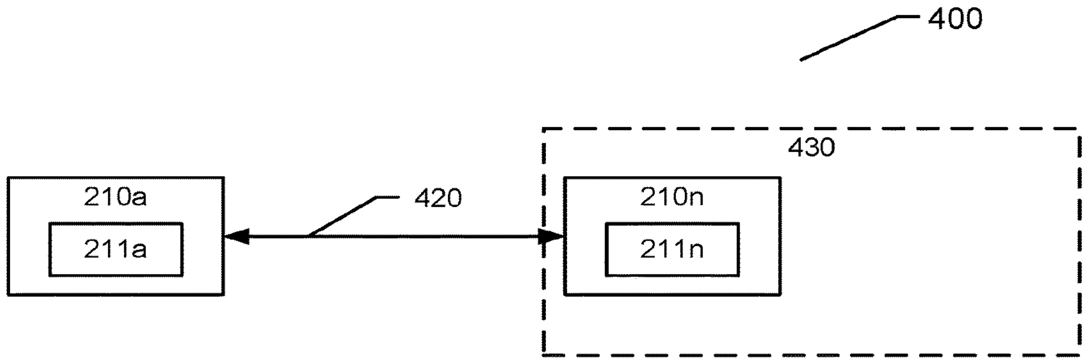
FIG. 4 shows a group of vehicles implementing a collaborative sensing technique according to an embodiment of the disclosure.

FIG. 4 shows a group of vehicles 400 implementing the collaborative sensing technique according to an embodiment of the disclosure. The group of vehicles 400 includes multiple vehicles 410*a*-410*n*. The group of vehicles 400 can communicate with each other. For example, the group of vehicles 400 can communicate through a cellular network. Alternatively, the group of vehicles 400 can form a wireless ad hoc network and communicate with each other through the ad hoc network. Wireless channels can thus be established between members of the group of vehicles 400. A wireless channel 420 between vehicles 210*a* and 210*n* are shown in FIG. 2, while other wireless channels are not shown.

Structures and functions of each of the group of vehicles 400 can be similar to that of the vehicle 100 in FIG. 1 example. For example, each of the group of vehicles 400 may include a processor 411*a*-411*n*. The processor 411*a*-411*n* can perform functions similar to the processor 121 in FIG. 1 example. However, the group of vehicles 400 is not required to have the same structures or functions in order to implement the collaborative sensing technique. For example, members of the group of vehicles 400 may be equipped with different sensors having different capabilities. Members of the group of vehicles 400 may have different computation resources (for example, different number of processors with varied computational power) and may run different algorithms for detecting an object. Members of the group of vehicles 400 may be products of different auto makers, and may or may not have the capability to operate autonomously.

In one example, the group of vehicles 400 forms a caravan travelling along a road. The vehicle 410*a* is positioned at the end of the caravan and needs road condition information of a road segment ahead of the vehicle 410*a*. The group of vehicles 200 can then collaboratively perform a sensing process to produce and provide road condition information to the vehicle 410*a*.

During an initial phase of the sensing process, the vehicle 410*a* selects a vehicle in the group of vehicle and transmits a request for road condition information to the selected vehicle. In one example, the vehicle 410*a* selects a vehicle positioned near the start point of a road segment to transmit the request. For example, the road segment may start at a point several miles ahead of the vehicle 410*a*. Assuming the vehicle 410*a* needs road condition information of a road segment 430 and the vehicle 410*n* is at the start point of this segment, the vehicle 410 transmits the request to the vehicle 410*n*.

The request for road condition information may specify the end location of the road segment. In addition, the request may specify what types of road condition information is required. For example, road condition information may include information of traffic conditions, weather conditions, obstacles detected on the road, type of a road, and the like The selected vehicle 410*n* receives the request for road condition information from the vehicle 410*a*, and subsequently starts to produce the road condition information as required by the request. To do that, the vehicle 410 may activate related sensors to start their sensing operation. For example, the vehicle 410*n* may request for traffic conditions. Accordingly, camera sensors and/or positioning sensors may be activated. The vehicle 410*n* then processes the sensor data to produce the requested road condition information. For example, for traffic conditions, the processor 411*n* of the vehicle 410*n* can calculate a speed of the vehicles 410*n* based on sensor data from the positioning sensors. Alternatively or additionally, the vehicle 410*n* can process image data from cameras to estimate traffic status surrounding the vehicle 410*n*. For other road condition information, other types of sensors can be employed and respective sensor data processing algorithms can be used. Road condition information can thus be obtained as the result of the sensor data processing process.

The request for road condition information can specify a frequency for transmitting the road condition information to the vehicle 410. In one example, the request specifies a time interval, and requires the vehicle 410*n* to periodically transmit the road condition information to the vehicle 410*n* for each time interval. For example, the time interval may be two minutes. Accordingly, the transmission of road condition information is performed every two minutes. During each time interval, the processor 411*n* can produce an average result as the road condition information based on sensor data generated within the time interval, or a result calculated based on sensor data acquired at a time instant.

In another example, the request for road condition information specifies a distance interval, and requires the vehicle 410*n* to transmit the road condition information for each distance interval. Similarly, the processor 411*n* can process the sensor data to produce a result for each distance interval. The result can be an average result based on sensor data acquired while the vehicle 410*a* traversing the distance interval, or a result calculated based on sensor data corresponding to a time instant.

In one example, instead specifying a road segment for the sensing operation, a request for road condition information may specify a time period for sensing road conditions. Accordingly, the vehicle 410*n* continues the operations of producing and transmitting the road condition information during the specified time period. The operations can be either based on a time interval or a distance interval specified by the request.

Figure 5:
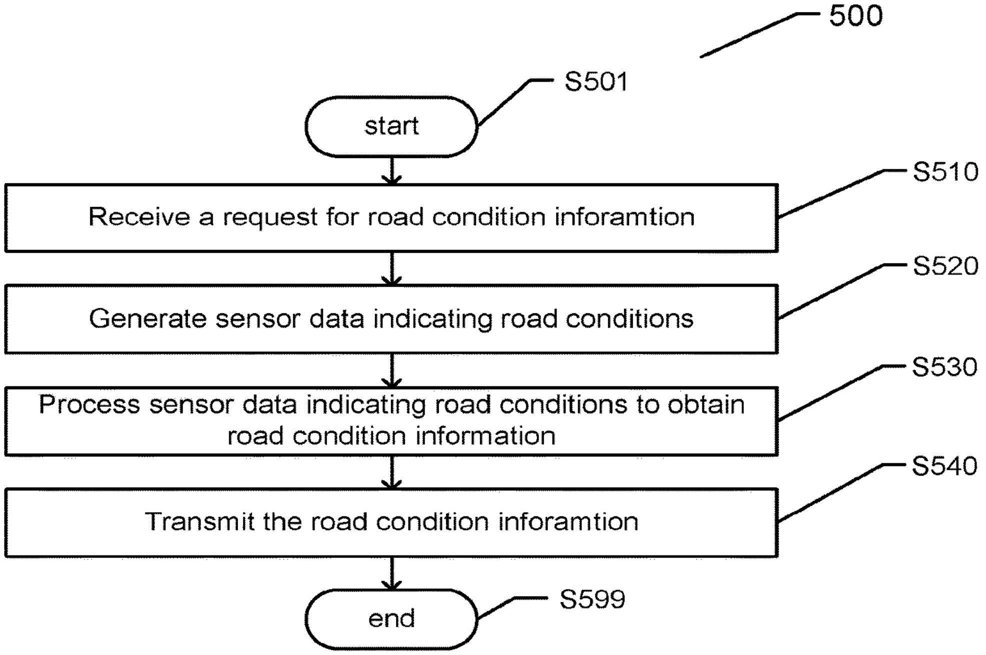
FIG. 5 shows a flowchart of a collaborative sensing process according to an embodiment of the disclosure.

FIG. 5 shows a flowchart of a collaborative sensing process 500 according to an embodiment of the disclosure. The process 500 can be performed by the vehicle 410*n* in FIG. 4 example. The process 500 starts at S501 and proceeds to S510.

At S510, a request for road condition information is received from a first vehicle at a second vehicle. The request may specify a road segment for obtaining the road condition information. In addition, the request may specify what type of road condition information is required.

At S520, sensor data indicating road conditions is generated. For example, suitable sensors of the second vehicle are activated to capture road conditions specified by the request.

At S530, sensor data indicating road conditions is processed to generate road condition information.

At S540, the road condition information is transmitted to the first vehicle. The process proceeds to S599 and terminates at S599.

In various examples, the steps of S520-S540 can be repeated for different time intervals or distance intervals specified by the request until the road segment is traversed by the second vehicle. Alternatively, the steps of S520-S540 can be repeated for different time intervals or distance intervals specified by the request for a period of time specified by the request.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

receiving sensor data indicating an object at a first vehicle of a group of vehicles communicating with each other;

when the first vehicle has insufficient computation resources to determine the object, the computation resources of the first vehicle are unavailable, or the first vehicle does not trust a determination of the object made by the computation resources of the first vehicle, transmitting a first request including the sensor data and specifying a first task for determining the object from the first vehicle to a second vehicle of the group of vehicles, the first task being performed by the second vehicle to produce first intermediate data; and transmitting a second request specifying a second task for determining the object from the first vehicle to a third vehicle of the group, the second task being performed by the third vehicle based on the first intermediate data produced by the second vehicle.

2. The method of claim 1, further comprising:

receiving a conclusion of determining the object from the third vehicle performing the second task to reach the conclusion of determining the object.

3. The method of claim 1, further comprising:

creating vehicle profiles at the first vehicle corresponding to other members of the group of vehicles.

4. The method of claim 1, further comprising:

selecting vehicles for respective tasks for determining the object.

5. The method of claim 4, wherein selecting vehicles for respective tasks for determining the object include:

selecting a vehicle having the most computation resources in a list of vehicles capable of performing a task to perform the task.

6. The method of claim 4, wherein selecting vehicles for respective tasks for determining the object include:

selecting a vehicle whose communication channel to the first vehicle has the least delay in a list of vehicles capable of performing a task to perform the task.

7. The method of claim 1, wherein selecting vehicles for respective tasks for determining the object include:

selecting a vehicle of the same make as the first vehicle in a list of vehicles capable of performing a task to perform the task.

8. An autonomous driving system, comprising circuitry configured to:

receive sensor data indicating an object at a first vehicle of a group of vehicles communicating with each other;

when the first vehicle has insufficient computation resources to determine the object, the computation resources of the first vehicle are unavailable, or the first vehicle does not trust a determination of the object made by the computation resources of the first vehicle, transmit a first request including the sensor data and specifying a first task for determining the object from the first vehicle to a second vehicle of the group of vehicles, the first task being performed by the second vehicle to produce first intermediate data; and transmit a second request specifying a second task for determining the object from the first vehicle to a third vehicle of the group, the second task being performed by the third vehicle based on the first intermediate data produced by the second vehicle.

9. The autonomous driving system of claim 8, wherein the circuitry is further configured to receive a conclusion of determining the object from the third vehicle performing the second task to reach the conclusion of determining the object.

10. The autonomous driving system of claim 8, wherein the circuitry is further configured to create vehicle profiles at the first vehicle corresponding to other members of the group of vehicles.

11. The autonomous driving system of claim 8, wherein the circuitry is further configured to select vehicles for respective tasks for determining the object.

12. The autonomous driving system of claim 11, wherein the circuitry is further configured to select a vehicle having the most computation resources in a list of vehicles capable of performing a task to perform the task.

13. The autonomous driving system of claim 11, wherein the circuitry is further configured to select a vehicle whose communication channel to the first vehicle has the least delay in a list of vehicles capable of performing a task to perform the task.

14. The autonomous driving system of claim 11, wherein the circuitry is further configured to select a vehicle of the same make as the first vehicle in a list of vehicles capable of performing a task to perform the task.

* * * * *